United States Patent Office 2,978,434
Patented Apr. 4, 1961

2,978,434

SULFUR-STABILIZED POLYESTER-CONTAINING MOLDING COMPOSITION

Arthur M. Howald, Perrysburg, Ohio, assignor to Glaskyd, Incorporated, Perrysburg, Ohio, a corporation of Ohio No Drawing. Filed Nov. 15, 1956, Ser. No. 622,260

6 Claims. (Cl. 260—45.7)

This invention relates to a molding composition, and, more particularly, to such a composition containing a polymerizable polyester-type binder and sulphur as a stabilizer.

Various polymerizable polyester materials are known, for example of the ethylene glycol, propylene glycol, phthalic anhydride and maleic anhydride type. Such polymerizable materials have been used in the production of molding compositions; examples of such molding compositions are disclosed in U.S. Patent 2,701,054. Molding compositions of this type have various known characteristics which suit them admirably for many uses, but are somewhat unstable, tending to polymerize even under ordinary storage conditions. Various stabilizers for use with such materials in order to retard polymerization at room temperature have been suggested. Most such stabilizers, however, also retard polymerization at normal curing temperatures, so that minimum curing times required at any given temperature to achieve maximum hardness and water resistance are increased by the use of such stabilizers. It has also been known that high sulphur rubbers, when used in bag-molding of polyester compositions, inhibit the polymerization of the polyester materials, at normal curing temperatures, so it would have been assumed that sulphur could not satisfactorily be used to stabilize such a material against room temperature polymerization.

The present invention is based upon the discovery that sulphur, in certain proportions, is an excellent stabilizer for use with polymerizable polyester materials, and specifically for use in molding compositions containing polymerizable polyester materials. The sulphur greatly retards polymerization at storage temperatures, but without appreciably affecting polymerization rate or extent at normal curing temperatures.

It is, therefore, an object of the invention to provide a new stablized polyester-containing composition.

It is another object of the invention to provide a new molding composition.

It is a further object of the invention to provide a polymerizable polyester molding composition containing a new stabilizer.

Other objects and advantages will be apparent from the description which follows, which is intended only to illustrate and disclose, but in no way to limit, the invention.

A new molding composition is provided according to the invention. Such composition comprises a polymerizable, ethylenically unsaturated polyester binder, and from 0.01 percent to 0.5 percent of sulphur, based upon the weight of the polyester binder. It is preferred that the sulphur be dissolved in some constituent of the molding composition, and evenly distributed throughout the molding composition. It is also preferred that the sulphur be present in an amount ranging from 0.05 percent to 0.25 percent, and most preferred that it be present to the extent of about 0.1 percent, on the indicated basis.

As is well known in the art, molding compositions comprising a polymerizable, ethylenically unsaturated polyester binder usually include, in addition to the binder, an organic peroxide, organic ozonide, or other similar catalyst, a mold release material or lubricant, and a filler composition, which may be a combination of a finely divided filler which is sometimes designated an extender, and a fibrous filler such as glass fibers, asbestos or the like. An ethylenically unsaturated monomeric material which is copolymerizable with the polyester binder is also frequently employed. Binder compositions that have been found to be most satisfactory for producing molding compositions are polyesters produced from a plurality of reactants including at least one 1,2-ethylene dicarboxylic acid. However, other polymerizable unsaturated alkyd resins having molecules which include a plurality of polymerizably reactive 2,3-enedioyl groups can also be employed. A detailed discussion of ethylenically unsaturated polyester binders and of molding compositions containing such binders will be found in U.S. Patent 2,632,751. In general, any such polymerizable molding composition can be stabilized by incorporation therein of sulphur in the indicated proportions. The stabilization is observed only in molding compositions including a catalyst of the indicated type, as polymerization, either at room temperature or at any elevated temperature, does not occur at an appreciable rate in the absence thereof. Such catalysts are usually employed in amounts ranging from about 0.5 percent to about 4 percent (preferably from about 1 percent to about 3 percent, and most desirably about 2 percent), based upon the weight of the polyester binder. The term "polyester binder" as used herein and in the appended claims with reference to percent sulphur includes both the polyester material and any copolymerizable monomer.

Relatively non-volatile copolymerizable monomeric materials such as diallyl phthalate are usually employed in preference to more volatile monomers such as styrene. Excellent results have been achieved by dissolving the sulphur in the copolymerizable monomer.

The following example is presented solely for the purpose of further illustrating and disclosing the invention, and is in no way to be construed as a limitation thereon.

*Example*

A 0.1 gram portion of powdered sulphur and a 2 gram portion of benzoyl peroxide were dissolved in 10 grams of diallyl phthalate. The resulting solution was then mixed with 90 grams of a polymerizable composition composed of 11.7 grams of diallyl phthalate and 78.3 grams of a polymerizable polyester, and the resulting material was mixed with 400 grams of ground limestone filler and 62 grams of glass fibers. The polymerizable composition used was identical with one which is commercially available under the trade designation "Laminac 4201," except for proportions of diallyl phthalate and ethylenically unsaturated polyester, which were as indicated above. After sufficient mixing to produce a uniform putty-like composition the material was tested for elevated temperature stability and for rate of cure. It was found that small balls of the molding material did not gel to an extent such that a knife blade could not be pushed manually thereinto until they had been heated for ninety minutes in an oven maintained at a temperature of 180° F. Small test pieces approximately 1½″ in diameter and ⅛″ in thickness were also molded from the composition, using 20 second and 1 minute cures in compression molds maintained at a temperature of 310° F. to 320° F. Hardness tests were made with a standard piece of testing equipment known under the trade designation "Barcol Impressor" and the hardness readings on the "Barcol" scale were found to be 74 and 71, respectively, for pieces cured at 20 seconds and 1 minute.

When the procedure described in the foregoing example was repeated except that the sulphur was omitted, it was found that a putty-like molding composition was produced, but that balls of the compositions gelled to an extent such that a knife blade could not be pushed manually into the balls after having been heated for only 15 to 20 minutes in an oven maintained at 180° F. Moldings of the same size and shape, and cured under the same conditions as those discussed in the example, were produced from the unstabilized composition. It was found that such moldings cured for 20 seconds and 1 minute had "Barcol" hardnesses of 73 and 72, respectively, which are identical, within the experimental error of the "Barcol Impressor" with the hardness readings obtained on compositions in accordance with the invention. The presence of sulphur in the composition according to the invention, therefore, did not affect the cure of the molding composition using as little as a 20 second curing cycle at a conventional mold temperature of 310° F. to 320° F.

The procedure described in the foregoing example can also be repeated, with similar results using polymerizable polyester materials commercially available under the trade designations "Plaskon 911," "Selectron 5065," "I C 638," and others. Known polymerizable monomeric materials other than diallyl phthalate can also be employed, if desired, and various known modifying additives can be used.

It will be apparent that various changes and modifications can be made from the specific details discussed above without departing from the spirit and scope of the attached claims.

What I claim is:

1. A molding composition comprising a polymerizable, ethylenically unsaturated polyester binder which is a product of a reaction between at least one dicarboxylic acid, including an ethylenically unsaturated dicarboxylic acid and at least one polyhydroxy alcohol and from 0.01 percent to 0.5 percent of sulphur, based upon the weight of the polyester binder.

2. A molding composition comprising a polymerizable, ethylenically unsaturated polyester binder which is a product of a reaction between at least one dicarboxylic acid, including an ethylenically unsaturated dicarboxylic acid and at least one polyhydroxy alcohol and from 0.05 percent to 0.25 percent of sulphur, based upon the weight of the polyester binder.

3. A molding composition comprising a polymerizable, ethylenically unsaturated polyester binder which is a product of a reaction between at least one dicarboxylic acid, including an ethylenically unsaturated dicarboxylic acid and at least one polyhydroxy alcohol and about 0.1 percent of sulphur, based upon the weight of the polyester binder.

4. A molding composition comprising a polymerizable, ethylenically unsaturated polyester binder which is a product of a reaction between at least one dicarboxylic acid, including an ethylenically unsaturated dicarboxylic acid and at least one polyhydroxy alcohol and, based upon the weight of the polyester binder, from about 0.5 percent to about 4 percent of a catalyst of the class consisting of organic peroxides and organic ozonides, and, on the indicated basis, from 0.01 percent to 0.5 percent of sulphur.

5. A molding composition comprising a polymerizable, ethylenically unsaturated polyester binder which is a product of a reaction between at least one dicarboxylic acid, including an ethylenically unsaturated dicarboxylic acid and at least one polyhydroxy alcohol and, based upon the weight of the polyester binder, from about 1 percent to about 3 percent of a catalyst of the class consisting of organic peroxides and organic ozonides, and, on the indicated basis, from 0.05 percent to 0.25 percent of sulphur.

6. A molding composition comprising a polymerizable, ethylenically unsaturated polyester binder which is a product of a reaction between at least one dicarboxylic acid, including an ethylenically unsaturated dicarboxylic acid and at least one polyhydroxy alcohol and, based upon the weight of the polyester binder, about 2 percent of a catalyst of the class consisting of organic peroxides and organic ozonides, and, on the indicated basis, about 0.1 percent of sulphur.

References Cited in the file of this patent

UNITED STATES PATENTS 2,568,331     Frilette _____ Sept. 18, 1951

FOREIGN PATENTS 516,331     Canada _____ Sept. 20, 1955

OTHER REFERENCES

Cass et al.: Ind. Eng. Chem., 46 1619 (1954).